United States Patent [19]

Danilenko et al.

[11] Patent Number: 4,691,279
[45] Date of Patent: Sep. 1, 1987

[54] INSTRUCTION BUFFER FOR A DIGITAL DATA PROCESSING SYSTEM

[75] Inventors: Michael Danilenko, West St. Paul; John T. Rusterholz, Roseville; Archie E. Lahti, Fridley, all of Minn.

[73] Assignee: Unisys Corporation, New York, N.Y.

[21] Appl. No.: 585,708

[22] Filed: Mar. 2, 1984

[51] Int. Cl.⁴ .............................................. G06F 12/08
[52] U.S. Cl. .............................................. 364/200
[58] Field of Search ... 364/200 MS File, 900 MS File

[56] References Cited

U.S. PATENT DOCUMENTS

| | | | |
|---|---|---|---|
| 3,828,316 | 8/1974 | Card et al. | 364/200 |
| 4,276,609 | 6/1981 | Patel | 364/900 |
| 4,381,541 | 4/1983 | Baumann, Jr. | 364/200 |
| 4,407,016 | 9/1983 | Bayliss | 364/200 |

Primary Examiner—Archie E. Williams, Jr.
Assistant Examiner—Emily Yue Chan
Attorney, Agent, or Firm—Charles A. Johnson; Lawrence J. Marhoefer

[57] ABSTRACT

A method and a means of increasing the performance of an instruction buffer in a digital data processing system is disclosed. The improvement is accomplished by by-passing the content addressable memory operation which has heretofore been utilized to access page addresses in the instruction buffer. As each word included on the same page was accessed, the CAM was repetitiously activated even though it was accessing the same page. In the present system, word accesses made to the same page are handled in a much improved manner. In the present system, a comparator is implemented in the system which compares the presently reference page with the previously referenced word, so that when a match is noted, i.e., the same page is indicated, the CAM is bypassed and successive requests made to the same page are satisfied from the instruction buffer by a validity designator which designates that the presently referenced word is the correct one.

11 Claims, 12 Drawing Figures

FIG. 1 f - FUNCTION CODE (SPECIFIES OPERATION TO BE PERFORMED)

| t | DEFINITION |
|---|---|
| 0 | SINGLE-PRECISION INTEGER |
| 1 | DOUBLE-PRECISION INTEGER |
| 2 | SINGLE-PRECISION FLOATING POINT REAL |
| 3 | DOUBLE-PRECISION FLOATING POINT REAL |
| 4-7 | RESERVED |
| r1 | SELECTS A REGISTER FROM THE G REGISTER SET |
| b | SELECTS A G REGISTER CONTAINING 36 BIT VIRTUAL ADDRESS |
| u | 16 BIT NON-NEGATIVE OFFSET TO WHICH IS ADDED THE 36 BIT VIRTUAL ADDRESS FROM THE G REGISTER SPECIFIED BY b TO FORM THE TARGET VIRTUAL ADDRESS, OR FOR JUMP INSTRUCTIONS IT IS THE JUMP TARGET ADDRESS |

INSTRUCTION BUFFER FOR A DIGITAL DATA PROCESSING SYSTEM

BACKGROUND OF THE INVENTION

A. Field of the Invention

This invention relates to programmable digital data processors, with emphasis on the improvement of the performance on buffering storage systems associated with such data processors. More particularly, it relates to a means of addressing these storage devices, also called herein CACHE memories, in a more rapid manner.

B. Prior Art

Many increases in computing rates have been achieved through advances in physical technologies relating to hardware and hardware functioning. The advent of integrated circuitry gave rise to circuit components operable at extremely high computing rates. They are capable of performing complex functions while remaining economically feasible. Access to, and cycle times of, storage systems have also been markedly increased.

In addition to the changes and developments in the hardware, there have been continuing advances in the organizational architecture of such digital data processing systems that provide for ever increasing utilization of the various data processing components.

While many examples of optimization of the utilization of the various components comprising the digital data processing system can be described, attention will be directed herein to the concept of increasing data processing throughput rates by providing a system which improves the performance of an instruction buffer device by increasing the speed at which it is accessed to correspondingly increase its informational output rate.

It has been known for some time that a Content Addressable Memory (CAM) may be used to make references to an instruction buffer. The present instruction buffer contains a total of sixteen (16) pages of 256 words each. Each page is individually addressable. It is also well known that a content addressable memory is addressably accessed and provides a corresponding address output (provided it resides therein) in a single clock time.

There is an extensive description of the use of a content addressable memory as an addressing means for a CACHE memory set forth in U.S. Pat. No. 3,848,234, entitled "Multi-Processor System with Multiple CACHE Memories" by Thomas Richard MacDonald and assigned to the same assignee as the present invention. The contents of that application are intended to be incorporated into this application by this reference.

It is seen from a reading of that patent that is also has been known for some time that an instruction buffer system may be used for providing sequential instructions to control processor operations. Although there may be many different instructions, a suggested format of a preferred instruction is disclosed herein. Basically, the present format is usually shown as a 36-bit word having a function portion, a definition portion, an address selection portion and an address offset portion.

More specifically, an address is presented to a content addressable memory (also known as an associative memory) and if the presented address matches any one of the addresses contained in the memory, that location is actuated and a proper CACHE address is generated. Since it takes one clock cycle to accomplish the content addressable memory operation and a further clock cycle to operate the instruction buffer, the overall operation consumes two clock cycles. Thus, this usual method of referencing the instruction buffer allows the CACHE memory to be referenced every two clock cycles. In the prior configuration this was accomplished in sixty nanoseconds, since a single clock cycle was thirty nanoseconds.

BRIEF DESCRIPTION OF THE INVENTION

A. Objects

Accordingly, it is an object of the present invention to provide an improved CACHE memory referencing system.

It is also an object of the present invention to provide an improved CACHE memory referencing system which is accomplished in a single clock cycle.

It is a still further object of the present invention to provide a system which enables instruction buffer references every clock cycle so long as such references are made to the same page address.

It is also an object of the present invention to provide a system which reduces by one clock cycle time the time required to accomplish a jump operation, so long as the jump operation is to an address on the same page as the earlier reference.

It is a still further object of the present invention to provide a system for increasing the instruction buffer (CACHE) performance by bypassing the content addressable memory (CAM).

It is another object of the present invention to provide a system for increasing the instruction buffer (CACHE) performance through the use of a comparator mechanism.

It is a still further object of the present invention to provide a system for increasing the instruction buffer (CACHE) performance by using a comparator which compares the present referenced page address with the last referenced page addresss in the CACHE memory.

It is also an object of the present invention to provide a system for increasing instruction buffer performance which doubles the performance at a relatively small additional cost.

B. Summary of the Invention

A system of increasing the performance of an instruction buffer (CACHE) is disclosed which, for certain circumstances, by-passes the usual content addressable memory (CAM) which has heretofore been used to reference the CACHE. Rather, under these limited conditions, a comparator is utilized to compare the present referenced page with the last referenced page in the CACHE. In this way, the performance of the instruction buffer is doubled for references made to the same page, since the time required to reference the instruction is reduced from two clock cycles to one. This increase in performance is accomplished at a relatively small cost. Furthermore, the present invention reduces by one clock cycle time, the time required for a jump reference, when it is within the same page address.

DETAILED DESCRIPTION OF THE PREFERRED EMBODIMENT OF THE INVENTION

Throughout the following description and in the accompaying drawings there are certain conventions employed which are familiar to those who are skilled in the art to which this invention pertains. In all of the drawings, identical reference designations denote corresponding components.

The signal lines and cables are accorded unique descriptive names invariant at all points of usage. Signal lines generally enter at the bottom and exit at the top and consequently signal flow is from bottom to top. Signals which enter or exit the logic circuits of the present figures altogether from outside the circuit are accorded descriptive symbolism in order than they may be clearly recognized. The specific logical symbols used, such as the adders, the registers, the comparator, etc. are of elements so well known in the art as to require no additional explanation.

Figure 1:
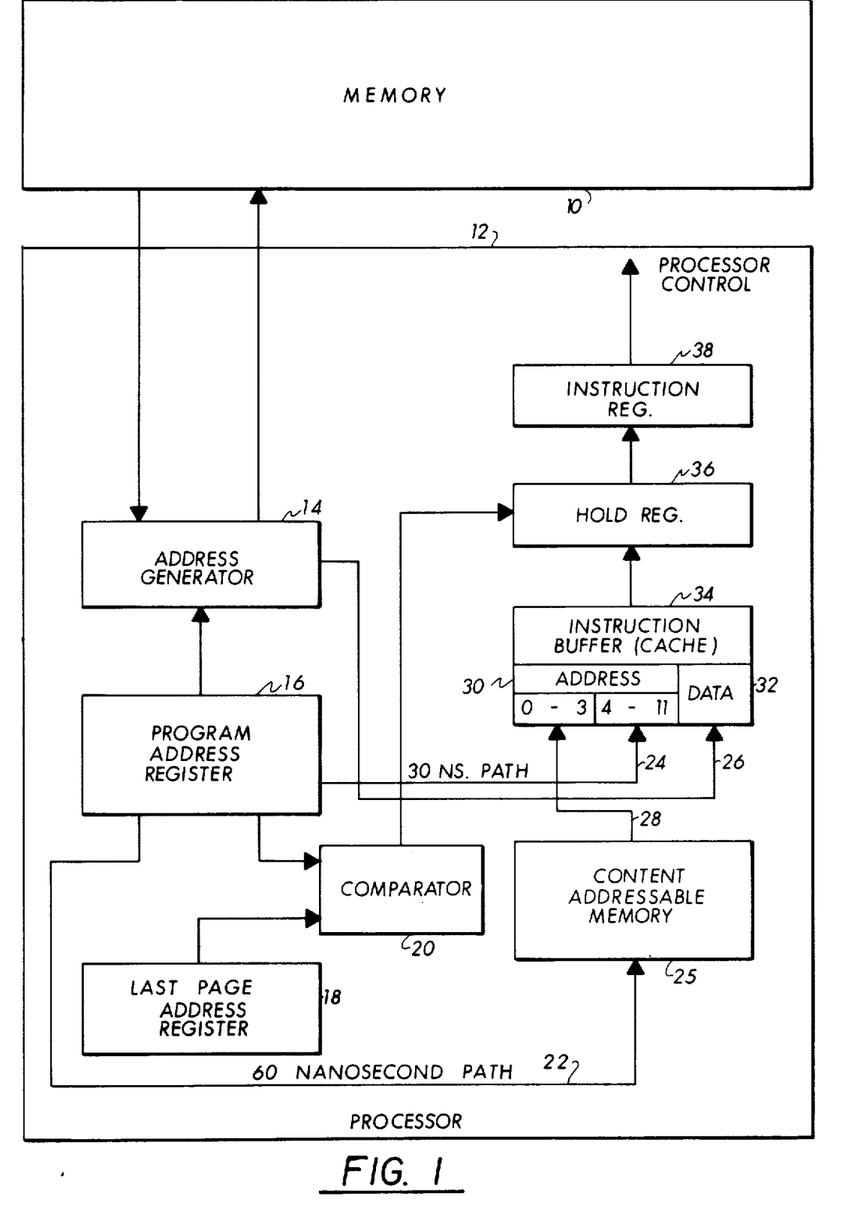
FIG. 1 is a simplfied block diagram showing the overall operation of the present invention using a memory and a processor block.

Referring, in particular to FIG. 1, there is shown the simplified block diagram of the present invention. Briefly, a memory 10 bidirectionally communicates with a processor 12 via the address generator 14 of the processor 12. The program address register 16 provides a total address which includes a page address, via cable 22, and a word address, via cable 24. As is readily seen, the page address is sent via the content addressable memory 25, while the word address is directly coupled to the instruction buffer 34. A last page register 18 provides the address of the last page to a comparator 20. The program address register 16 provides the current page address to the same comparator 20. An indication of equality from the comparator 20 denotes correspondence between the last page address and the present page address. Such correspondence, of course, signals that the new address is on the same page as the previous address. The equality signal from the comparator 20 enables the hold register 36 to pass the instruction received from the buffer 34 to the instruction register 38 for use as a processor control signal.

A disparity between the last page address and the present page address causes the comparator to indicate inequality. Such a signal prevents the hold register 36 from passing the received instruction from the buffer register 34 to the instruction register 38, since the word address received via the 30 nanosecond path is not on the same page as the previous word. It is believed readily seen that so long as each successive address is on the same page as the previous address the high speed (30 nanosecond) path is utilized. Conversely, where the new address is not on the same page, a new page must be addressed via the CAM 25 and the slower speed path 22 must be utilized.

Figure 2:
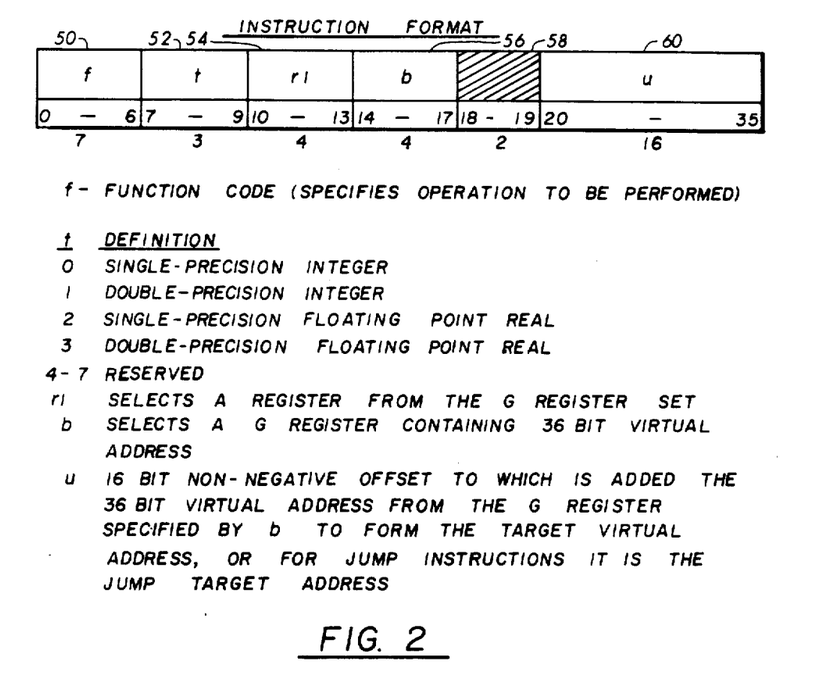
FIG. 2 is a suggested format of an instruction such as would be used with this invention.

FIG. 2 illustrates an instruction format, such as might be utilized for an instruction in the present system. A total of 36 bits are shown in the format. The f portion 50 includes 7 bits and specifies the function code which denotes the operation to be performed. The t portion 52 specifies the integer precision which is desired. The three bits of the t portion 52 are capable of providing eight different precision connotations. As illustrated, they include:

$t = 0 =$ single integer precision
$t = 1 =$ double integer precision
$t = 2 =$ single precision, floating point real
$t = 3 =$ double precision, floating point real
$t = 4-7$ (not used in this embodiment)

Next, the r1 portion 54 of the instruction selects a particular register from the group of registers seeking access, while the b portion 56 selects a particular register containing a 36 bit virtual address. Bits 18, 19, shown as portion 58, are not used in this application. Finally, the U portion 60 is a 16-bit non-negative off-set to which is added the 36-bit virtual address from the register specified by the b portion 56 to form the target virtual address, or for jump instructions it is the jump target address.

Figures 3, 4B, 5:
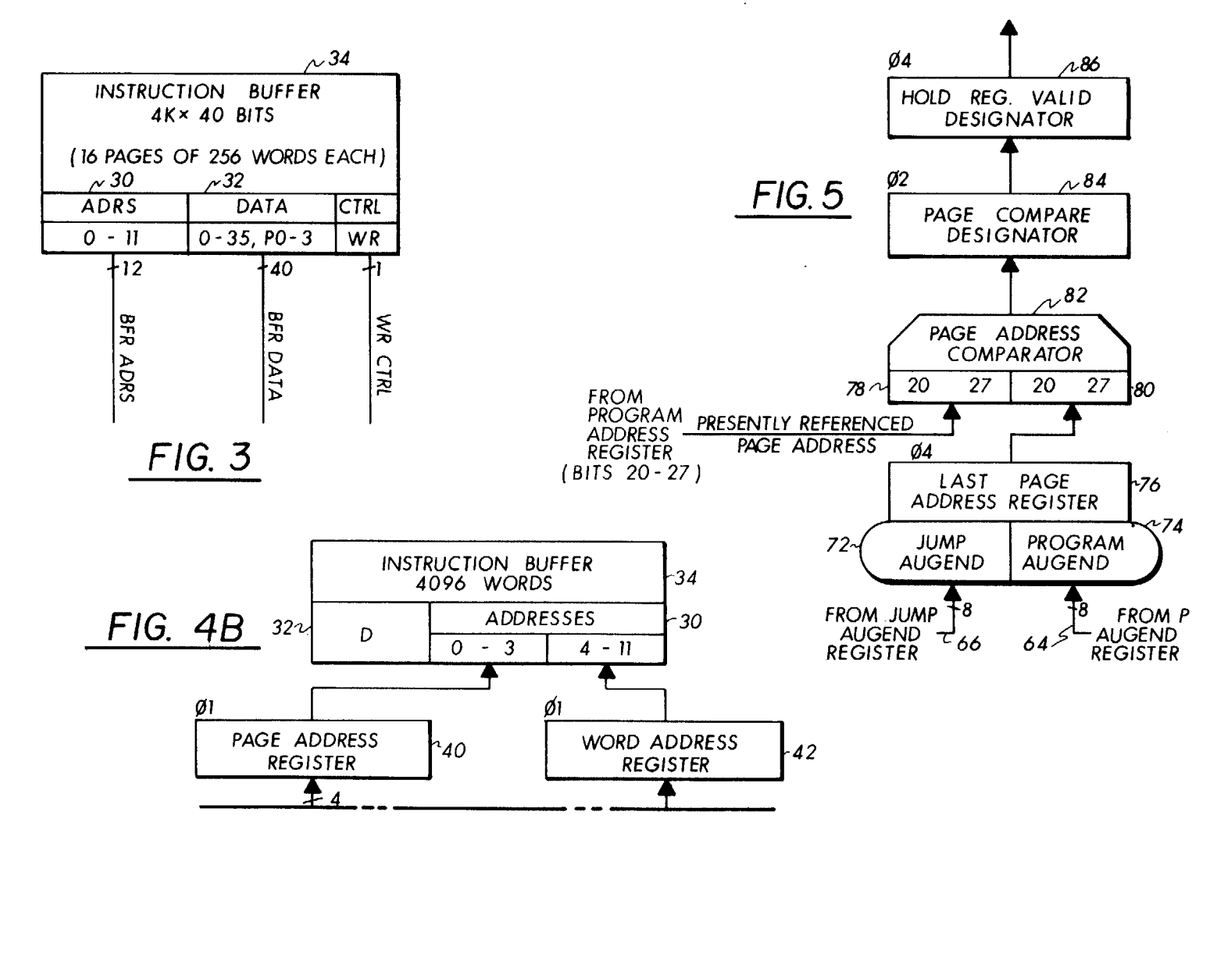
FIG. 3 is a simplified block diagram of the instruction buffer that is used herein.
FIGS. 4A and 4B, positioned as shown in FIG. 4 are a logic block diagram illustrating the prior art system wherein two clock cycles are required to reference the instruction buffer via the content addressable memory.
FIG. 5 is a logic block diagram illustrating the disclosed inventive apparatus for improving the performance of the address buffer referencing system of FIG. 1.

The instruction buffer 34 is shown in detail in FIG. 3. It comprises a memory of 4K (actually 4096) locations of 40 bits each (36 data, 4 parity bits). The buffer is partitioned into 16 pages of 256 words each. Inputs to the buffer include a buffer address 30 comprising 12 bits (0–11); the buffer input data 32 which includes 36 bits of data (0–35) and 4 bits of parity (p0–p3); and a one bit write control signal.

Normally, CACHE references are made by using the content addressable memory (CAM). The address is presented to the CAM and if it matches an address stored in the CAM, a CACHE or instruction buffer address is generated. By using this prior art approach to the referencing of the instruction buffer, it can be referenced every two clock cycles.

Figures 4, 4A:
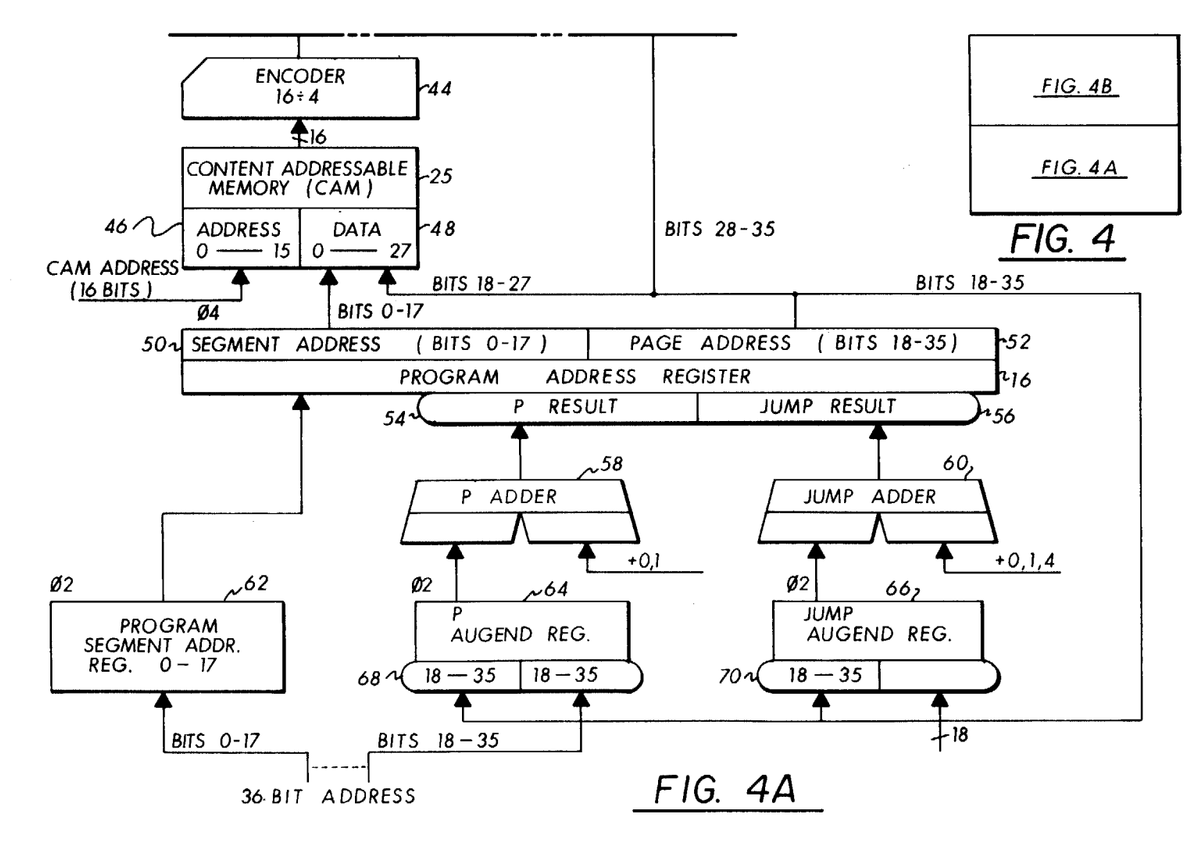
FIG. 4 includes the position of FIGS. 4A and 4B.

The present invention, as previously noted, enables instruction buffer references every clock cycle so long as the references are made to the same page address. The thirty-six (36) bit address used herein comprises the following information:

Bits 00–17 = Segment Address
Bits 18–19 = Always Zeroes (00)
Bits 20–27 = Page Address
Bits 28–36 = Word Address As shown in the block diagram of FIG. 4, a prior art system receives the 36-bit address. Bits 0 through 17 of the address enter the Program Segment Address Register 62 during phase 2 ($\emptyset$2) of the block train. During the same phase ($\emptyset$2) bits 18–35 of the same address enter the Program (P) Augend Register 64, via selector 68.

The eighteen bit program segment address is next transferred to the Program Address Register 16 as bits 0 to 17 of the program address. Similarly, the eighteen bit program augend is sent to the Program Adder 58 wherein a zero (0) or a one (+1) is added to the augend. The result of this addition is placed in the P Result portion 54 of a selection apparatus associated with the Program Address Register 16. The Segment Address output 50 of the Program Address Register 16 provides bits 0 to 17 of the Data input 48 of the Content Addressable Memory (CAM) 25. The sixteen locations contained in this CAM are addressed via the address input 46 and the 16-bit CAM address lines. In addition to the 18-bit segment address placed as data in the CAM 25, there are ten additional bits 18-27 arriving as data to the DATA input 48 of the CAM.

The operation of a content addressable memory is well known to those skilled in the art to which this invention pertains so it is not considered necessary to review its operation in any specific detail. Suffice it to say that in a content addressable memory, the entire contents of the memory are addressed in a single interrogation. For example, in each of the sixteen locations of the CAM, such as is disclosed herein, there are a total of 28 address bits that are used to interrogate the CACHE memory 34. The 28-bit CAM search address input addresses the sixteen locations of the memory and if there is correspondence between the interrogating address and any address presently contained in the memory, the cache address contents of that location emerges as the output data from the CAM memory. The important concept to note here is the ability of a single interrogation to provide an output when a comparison is made within the CAM. The term used herein to describe the operation when a comparison is indicated is called a "hit". A "hit" is a one-of-sixteen selection of output lines. Conversely, when a correspondence is not indicated in the CAM, the operation will be called a "miss", since the sought after word is not presently contained in the CAM.

From the CAM 25 a 16-bit output page address is encoded into four bits. This encoding into four bits is determined to satisfy the binary combinations required for sixteen addresses. If, for example, thirty-two pages were required, then five lines would be necessary, since the binary combinations would be $2^5$, rather than $2^4$. The encoding is, of course, accomplished by encoder 44.

The encoded four bits are sent to the Page Address Register 40 during phase 1 (∅1) and are transferred to the Instruction Buffer 34, as bits 0-3 of the address.

The remaining eight bits (bits 28-35) of the Page Address 52 output of the PAR 16 are also transfered to the Word Address Register 42 during phase 1 (∅1) and are later sent to the Instruction Buffer 34 as bits 4-11 of the address.

In this prior art configuration, each time a word address 42 was sent to the Instruction Buffer 34, a page address 40 was also sent to the same buffer. Consequently, since an additional full clock cycle was required to determine the page address via the Content Addressable Memory 25 for each access to the buffer there was a total requirement of two full clock cycles. In the present instance, since a single clock cycle is 30 nanoseconds, the total time required for each access using the CAM 25 was two clock cycles or 60 nanoseconds.

It is important to note that this two cycle requirement was even necessary for repetitious page accesses. Thus, since there are 256 words on each page, there may be as many as 256 accesses to the same page. Since each access to the page had to repeat the operation of the CAM 25, there may be a total of 256 clock cycles required just for the inclusion of the CAM 25 operation.

To overcome this excessive waste of time for repetitious page accesses, the apparatus as illustrated in FIG. 5 is disclosed.

Referring to FIG. 5, a first eight line input arrives from the P Augend Register 64 shown in FIG. 4. Similarly, a second eight line input arrives from the Jump Augend Register 66 also shown on FIG. 4. Both eight line inputs enter a dual port selection apparatus. The Program Augend enters selection port 74, while the Jump Augend enters port 72. When an ordinary sequential program instruction step is being accomplished (i.e. not a jump instruction) it is this P Augend which enters the Last Page Address Register 76 during phase 4 (∅4)). At the same time (∅4) P Augend +1 enters PAR 16. The contents of the Last Page Address Regiser 76 is, of course, the address of the last page utilized. The page presently being referenced in the Program Address Register 16 is sent as bits 20-27 to the input 78 of the Page Address Comparator 82.

This Page Address Comparator compares this presently referenced page address entering input 78 with the input 80 arriving from the Last Page Address Register 76. Correspondence between these two inputs provides an output signal to the Page Compare Designator 84 during phase 2 (∅2). Such correspondence, of course, indicates that the present page reference is the same as the last page reference. A Hold Register Valid Designator 86 receives an input signal, during phase 4 (∅4) and the presence of such a signal indicates that the output information from the Instruction Buffer is valid information and may be used.

In this way, the system constantly anticipates that the page address previously referenced is still valid and there is merely a change in word address. By doing this, the Content Addressable Memory 25 used to provide the page address is bypassed until such time as the Hold Register Valid Designator 86 indicates that the output emanating from the Instruction Buffer 34 is erroneous since the Comparator 82 inputs 78 and 80 do not correspond. It is readily seen that such a lack of correspondence will only occur when the new page reference is not the same as the previous page reference. In those cases where there is correspondence, the Content Addressable Memory 25 may be bypassed and the clock cycle time required by the use of the CAM is eliminated. As previously noted, this savings of time is substantial where there are multiple words addressed having the same page address. If there is no correspondence, then a "miss" is indicated and a new page is fetched.

Figures 6, 6B:
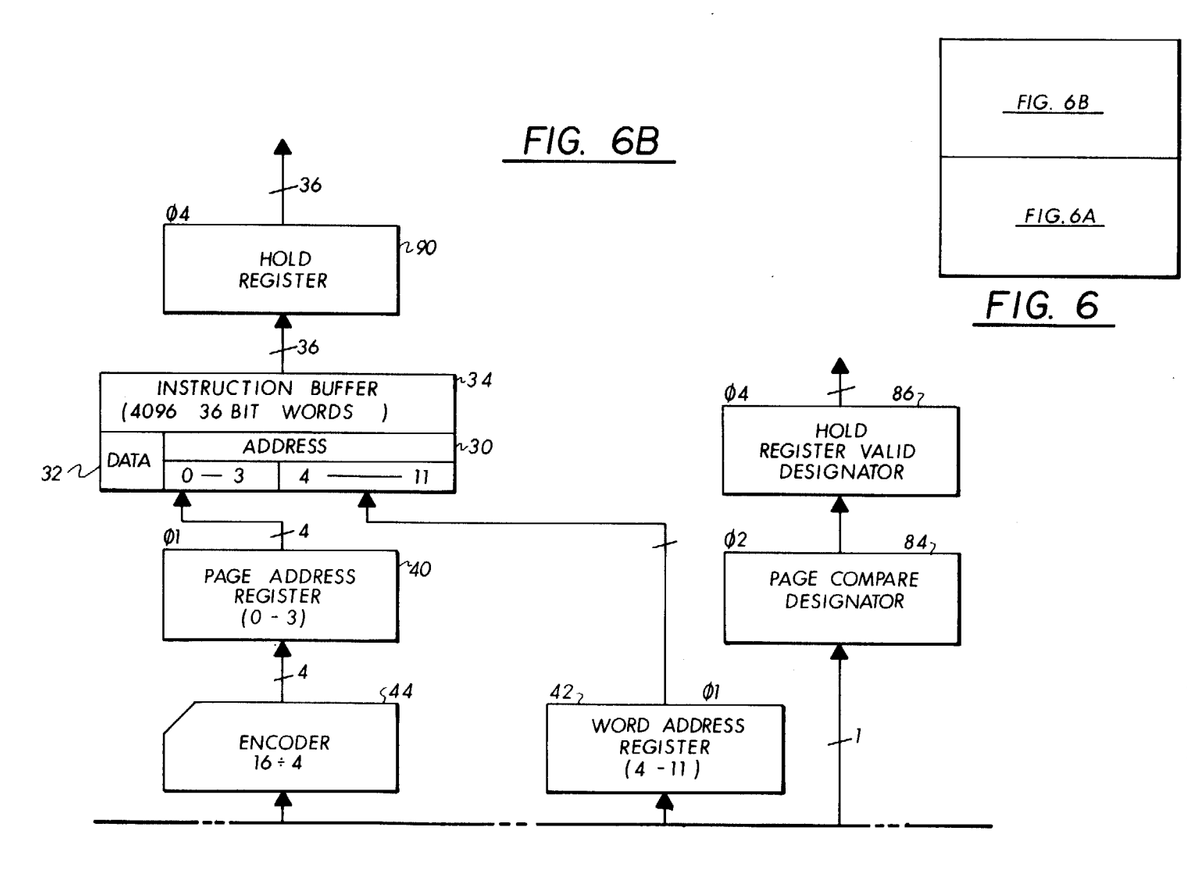
FIG. 6 includes the position of FIGS. 6A and 6B.
FIGS. 6A and 6B, positioned as shown in FIG. 6 are a composite logic block diagram showing the improvement included in the prior art system.
Figure 6A:
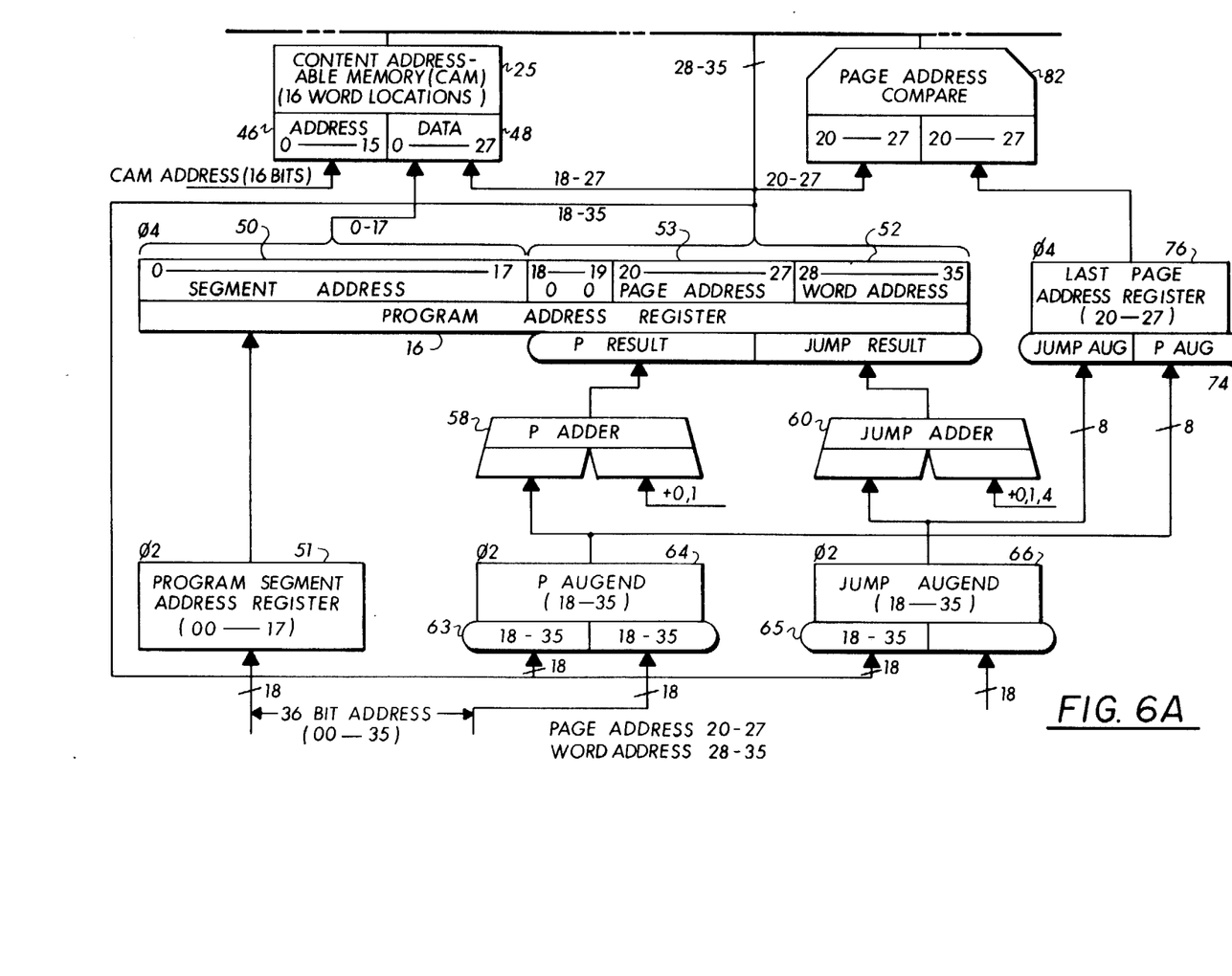

The system logical block diagram is illustrated in FIG. 6. In this figure the prior art system of FIG. 4 is combined with the improvement circuit of FIG. 5. Corresponding reference numerals have been used so that the respective elements used from FIGS. 4 and 5 are readily identifiable in FIG. 6. Thus, the Content Addressable Memory 25 from FIG. 4 and the Page Address Comparator 82 of FIG. 5 each have corresponding reference numerals in FIG. 6.

The previous description of FIG. 4, of course, also applies to FIG. 6, however there are now certain distinctive operational differences. For example, consider the CAM 25. Although its operation is identical to its operation in the previous description, it is often bypassed in the inventive embodiment.

Remember that the CAM 25 has sixteen word location. The Program Address Register (PAR) 16 sends address bits 00-27 to the data input 48 of the CAM 25.

When actuated, the CAM 25 sends a 16-bit address to the Encoder 44. The Encoder 44 converts these sixteen bits into a binary number. In the present instance, this conversion is to four bits, since in binary notation only four bits $2^4$ are necessary to denote the sixteen addresses. As previously noted, if thirty-two addresses were needed, then a plurality of five lines would be required to provide the binary address, since $2^5=32$.

This 4-bit binary code then corresponds to, and is representative of, the page address as specified by the CAM 25. This new page address is then placed in the page address register 40 after it is discovered that a comparison has not been made by comparator 82. Now, at this time, it is known where that page is located, since its address has already been placed in the Content Addressable Memory 25. The comparison is made with the address that is presently in the PAR 16 and an address is generated which indicates the presence of that data. As previously noted, this information is encoded via Encoder 44 and placed in the Page Address Register 40. Now as long as that same page is repeatedly requested after a comparison has been made, the sequence continues; the PAR is loaded every cycle with P Aug +1 to the PAR. Next, the CAM 25 is continuously checked to determine if this particular address corresponds to the address in the CAM (a hit). If it corresponds, then it takes only one clock cycle to obtain the Page Address and the sequence continues. If it does not, a lack of comparison (a miss) is generated and the process is completely stopped. A request is then generated to control to indicate that the specified page is not resident in the CAM, and the sequence must include a trip to memory to get the required page. Next, the whole sequence is repeated.

When this new page is obtained the address is already in the CAM and it has already been compared, so the page address generated. That page is then loaded in the buffer and the execution of the instruction is started. This execution sequence may continue for as long as two hundred and fifty six (256) addresses if all of the addresses on that page are desired.

It is believed readily seen that without this invention, the CAM 25 would have to be utilized every time. Thus, the CAM sequence must be included, for every address.

In the case of a JUMP sequence, the fastest that a jump may be made is ninety nanoseconds (three clock cycles). That is, if as a result of a jump instruction the jump is made to an address on the same page and if all of the necessary and correct responses are received which indicate to proceed with the jump, then this minimum time is necessary. On the other hand, if these appropriate responses are not received it will take a much longer time. In fact, the maximum cycle number is indefinite. It depends on what the processor is doing at the time and where the control is presently located. Normally, however, is a jump, is made which is not to the same page address, it usually takes four cycles. If, of course, it is to a same page address and the present apparatus is used for bypassing the CAM, then a full clock cycle could be saved.

Every time an address is generated in the PAR 16, this address is returned to the P Augend Register 64, and the P Adder 50 adds a one to the address. This sequence proceeds with the program i.e. one plus one, plus one and so on. If a JUMP instruction is indicated, the adding and referencing are stopped, an a JUMP instruction address is returned to the PAR 16.

To accomplish this JUMP instruction, an eighteen (18) bit address is placed in the PAR. This comes from the U portion 60 of the instruction itself shown in FIG. 2. This indicates what registers are to be used.

Once we get to the PAR 16 the operation is simple. At that point there exists a page address 3 and a word address 52. The word address is always taken from the PAR 16. It includes bits 28–35 of the total eighteen bits of address information.

The Program Segment Address Register 51 houses the segment address. This is the segment address in the memory. These eighteen bits represent the segment of the most significant eighteen bits of memory that goes to and is a part of the address that is being compared in the Content Addressable Memory 1–36. Every time the CAM 25 is loaded, these eighteen bits are in there. In fact, that is why a more simple page comparison may be used, since these eighteen bits remain the same. Thus, only the eight bits of the page address are taken and looked at each time, since the rest of the information is already in the buffer 34.

The addition of the Jump Adder 60 whenever a jump is made provides incrementation ability for the jump address.

Figure 7:
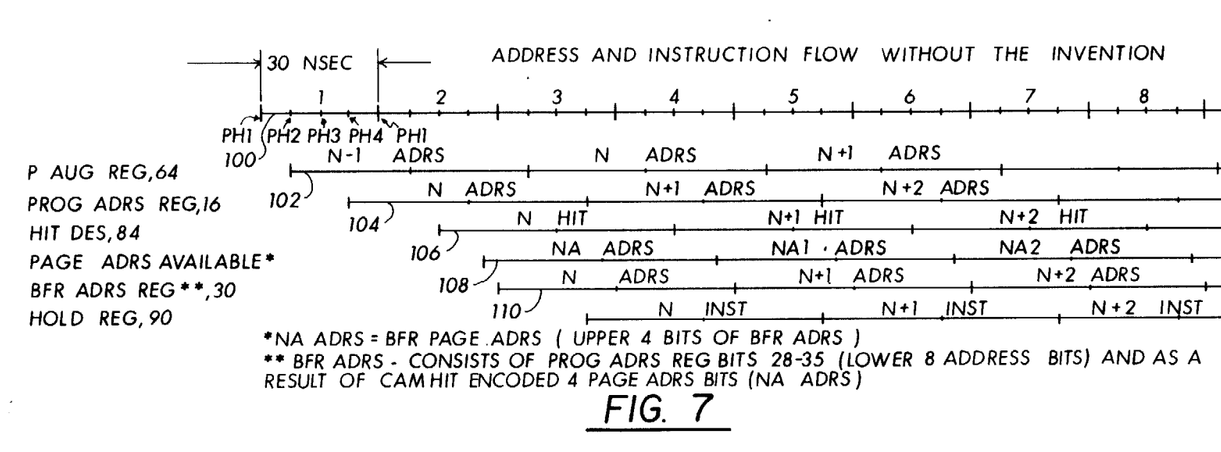
FIG. 7 is a timing diagram of the address and instruction flow without the invention.

FIG. 7 represents the timing diagram of the system without the invention. Thus, it illustrates the operation wherein the CAM 25 is used for every request.

The timing line 100 illustrates the timing pulses to the clocking system. The numerals 1, 2, 3 etc. along the clock timing line 100 represent the clock cycles, while the smaller lineations represent the various phases of the clock cycle. Thus, it is readily seen that each clock cycle is divided into four phases, $\emptyset 1$, $\emptyset 2$, $\emptyset 3$ and $\emptyset 4$. After which it returns to $\emptyset 1$ of the next clock cycle. Each clock cycle is shown as representing thirty nanoseconds (30 N sec) in the present configuration and each addressing sequence uses two clock cycles or 60 nanoseconds as previously described.

Consider next, the timing line 102 of the Program Augend Register 64. First, it receives a first address or N−1 address. As shown, it uses two clock cycles. It starts at $\emptyset 2$ of the first cycle of the clocking line 100 and continues to $\emptyset 2$ of the third clocking cycle. This is sequentially followed by the eight phases of the N address and thereafter by the eight phases of the N+1 address.

The Program Address Register, 16 timing sequence is shown by timing line 104. This starts with the N address at $\emptyset 4$ of the first clock cycle and continues through N+2 address concluding at $\emptyset 4$ of cycle seven (7).

The next timing line 106 illustrates the comparison of the two addresses. It is referred to in FIG. 6 as the Page Compare Designator 84. As previously noted, this is also called a Hit and is indicative of the addressed location being present in the CAM 16. As shown, there are three successive hits noted as N Hit, N+1 Hit, and N+2 Hit. The N Hit starts at $\emptyset 3$ of the second cycle and continues for two full clock cycles, i.e. to $\emptyset 3$ of the fourth clock cycle.

Generally therefore initially an N−1 address in the P Augend Register 40 and a 1 is added to the N−1 address to get the N address. So for the time line 108, the Page Address Available is illustrated. This sequence is not time related since no clocking sequence is involved here. It is just propagation time through the gates from the CAM 16 to the Page Address Register 40. It is shown as being clocked into Page Address Register 40 on cycle 3 of phase 1. This is when an address is being clocked into the Buffer Address Register 30. Similar clocking is occurring on the remainder of the address. Thereafter, the contents of the Program Address Register is transferred to the P Augend Register at ∅2 and this is shown as a loop in FIGS. 4 and 6. After this address is returned at ∅2 to Augend Register 64 the next address is the N+1 address. First, a one is added to it and then one to the sum and so on. Each time it takes 60 nanoseconds to execute the instruction. The Instruction Buffer Address Register comprises the Page Address Register 40 and the Word Address Register 42 and is shown as timing line 110. The Hold Register 36 of FIG. 1 is shown as timing line diagram 112.

Figure 8:
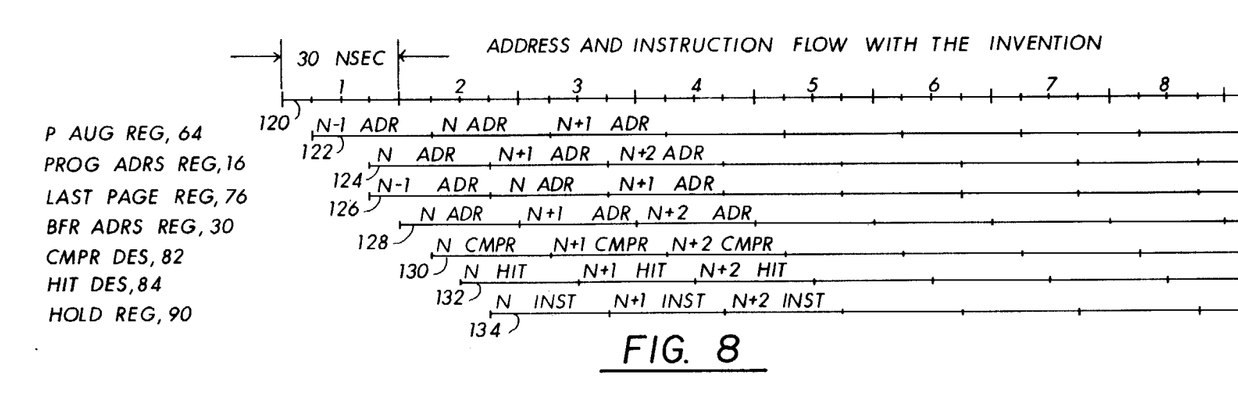
FIG. 8 is a timing diagram of the address and instruction flow when the present invention is implemented into the system.

Consider next FIG. 8, which illustrates the address and instruction flow with the inventive apparatus. The clocking diagram 120 is the same as 100 of FIG. 7, since the system timing is the same.

Shown is an N−1 address that passes through the N address and appears as the n address in the Program Address Register 16.

Now the Last Address Register 76 is part of the system and it includes the same address that resides in the P Augend Register 64. This is shown as timing line 126 in FIG. 8 and that is the same address that was executed just previous to this. This is now being put into the Last Page Register 76. Now, at that time, the Comparator 82 is comparing the N−1 address with the N address. The address in the Address Buffer 40,42 is the N address just being transferred and that is the word address that is presently being transferred to the Word Address Register 42. This is shown as the timing line 128 in FIG. 8.

The Page Compare Designator 84 in this case is set because this present page is the same as the one previously used. The "Hit" Designator 84 gets set a little bit later and this is shown by timing line 132 of FIG. 8. It is important to reiterate that the checking is constantly running ahead of the use sequence. If the time were taken to check the address the sequence could not be accomplished in the allotted time. It is this simplified form of checking i.e. comparison, that enables the sequence to continue so long as the comparison indicates a match between the previous page number and the present page number. Once a "Miss" is indicated, the CAM 25 must be utilized for the next request and a clock time is lost to allow the page number to pass through the CAM 25.

Returning to the Compare Designator 84, it was set on ∅2 as shown as the line 132. Note that each vertical line of line 100 represents a phase. The Word Address Register 42 was being set on ∅1. It takes three phases to determine what information is in the Instruction Buffer (CACHE) memory 34 and that information is then being strobed into the Hold Register 90 as shown in time line 134 of FIG. 8. This is being done on ∅4. It is readily seen in FIG. 8 that there are two phases between the Compare Designator 84 and the bit in the Hold Register Validity Designator 86. Because of the time difference it is possible to successfully accomplish the desired result. The desired result is to indicate by the validity bit of Register 86 that the information in the Hold Register 90 is valid and may be used. So at that time the validity bit is strobed and it will indicate whether the data put into the Hold Register 90 is valid and usable.

What has been shown and described here is a means of increasing the instruction buffer (CACHE) performance. This is accomplished by bypassing the Content Addressable Memory (CAM). The invention uses a comparator to compare the presently referenced page with the previously referenced page in the CACHE. If a match between the two is indicated, the requested location exists on the same page as the previous request so that there is not any need to pass through the CAM. This doubles the performance of the instruction buffer at very little cost.

What is claimed is:

1. In a data processing system, a instruction buffer comprising:
    (a) a program address register means for temporarily storing and providing as an output, a multiple bit address, which address includes, a page address portion and a word address portion;
    (b) a content addressable memory connected to said program address register means to receive therefrom and store therein a plurality of page addresses;
    (c) an instruction storage buffer means commonly coupled to said program address register means and said content addressable memory to receive a page address from said content addressable memory and a word address from the word address portion of said program address register means;
    (d) a previous page address register means coupled to the input of said program address register means to receive and store the address of the previous page sent to the program address register means;
    (e) a page address comparator means connected to the output of said program address register means and the output of the previous page address register means to receive and compare the address of the previous page address with the address of the present page address;
    (f) a validity indicating and storing means connected to said address comparator means for indicating validity and temporarily storing said indication when said page address comparator means denotes correspondence between the previous page and the present page addresses; and
    (g) a single instruction storage means connected to said instruction storage buffer for receiving and temporarily storing an output instruction from said instruction storage buffer means for providing a single output instruction, which is valid only when said validity indicating and storage means indicates page address correspondence by said address comparator means, and is invalid when said validity indicating and storage means indicates a lack of page address correspondence by said address comparator means.

2. The instruction buffer as set forth in claim 1 further including a page compare designator means coupled between said validity indicating and storing means and the page address comparator means which page compare designator means designates whether the page address comparator means has made an equal or unequal comparison.

3. The instruction buffer as set forth in claim 2 wherein said address comparator means is commonly coupled to the output of the previous page address register means to receive the previous page address and to the output of said program address register means to receive the present page address.

4. The instruction buffer as set forth in claim 1 wherein said previous page address register means includes an input selection means to receive an input program address augend or an input jump address augend from a program address augend register and a jump program augend register respectively as determined by the instruction address sequence received from an instruction control section of the digital data processing system.

5. The instruction buffer as set forth in claim 1 wherein said program address register means includes an input selection means for receiving either an input program address result or an input jump address result from a program address adder or a jump program adder respectively as selected by the instruction control section of the digital data processing system.

6. The instruction buffer as set forth in claim 5 wherein the program (p) adder has a first input from a program (p) augend address register and a second input which adds a zero (0), or a one (1) to the contents of the program (p) augend address register.

7. The instruction buffer as set forth in claim 6 wherein the jump adder has a first input from a jump augend address register and a second input which adds a zero (0), a one (1) or a four (4) to the contents of the jump augend address register.

8. The instruction buffer as set forth in claim 6 wherein the program (p) augend address register has an input selection means coupled thereto which has a first input portion connected to receive both the previous page address and the previous word address by a feedback connection from the output of the program address register.

9. The instruction buffer as set forth in claim 7 wherein the jump augend address register has an input selection means which has a first input portion also connected to receive the page address output and the word address output of the program address register.

10. The instruction buffer as set forth in claim 8 wherein the input selection means of the program (p) augend address register has a second input means connected to receive the page address and the word address of the input address from the instruction control of the digital data processing system.

11. The instruction buffer as set forth in claim 9 wherein the input selection means of the jump augend address register has a second input means connected to receive a separate input address portion from the instruction control of the digital data processing system.

* * * * *